March 5, 1940.  A. E. KELLEY  2,192,267
LATHE FOR TURNING SPECIAL SHAPES
Filed March 1, 1935  4 Sheets-Sheet 1
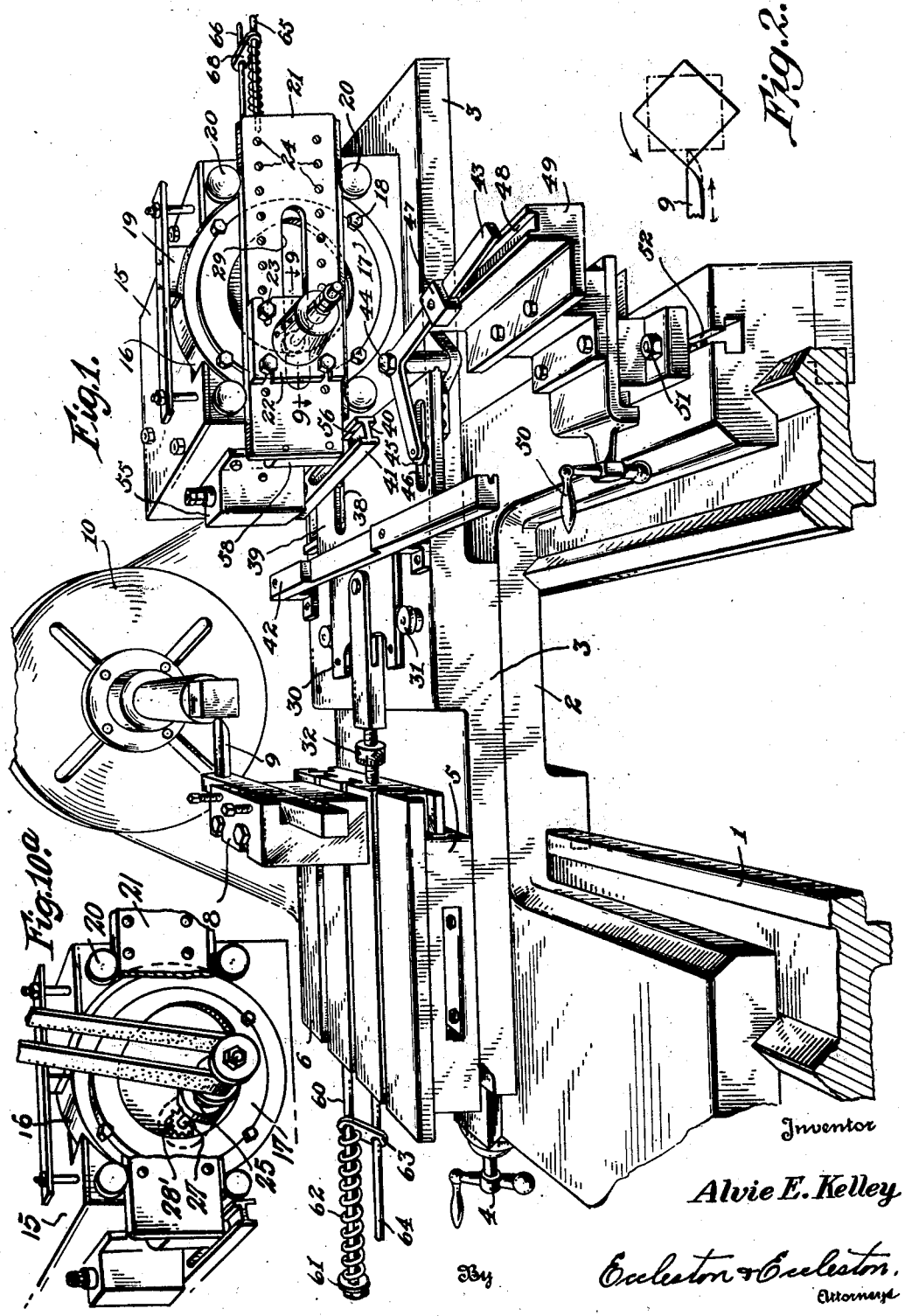
Inventor
Alvie E. Kelley

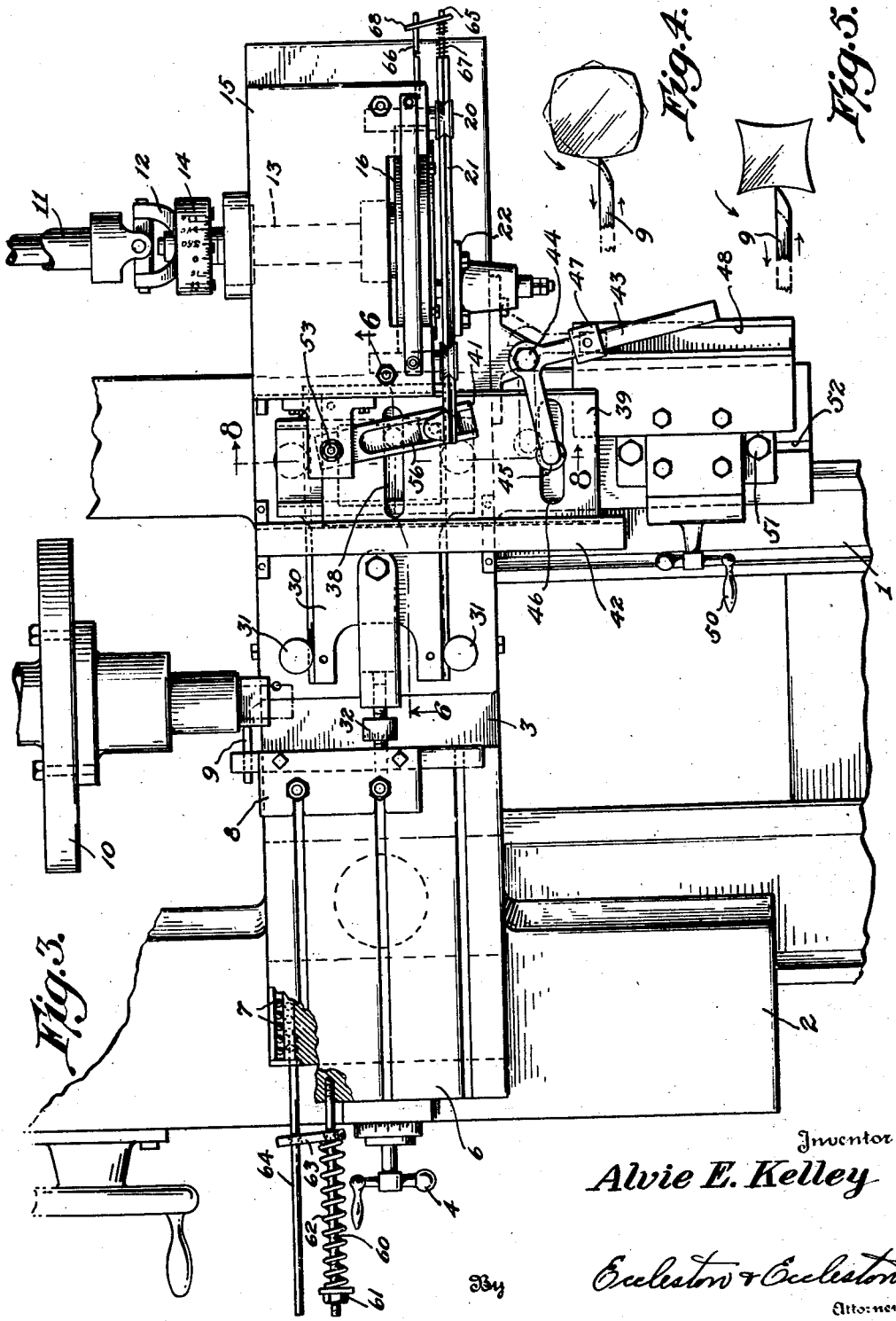

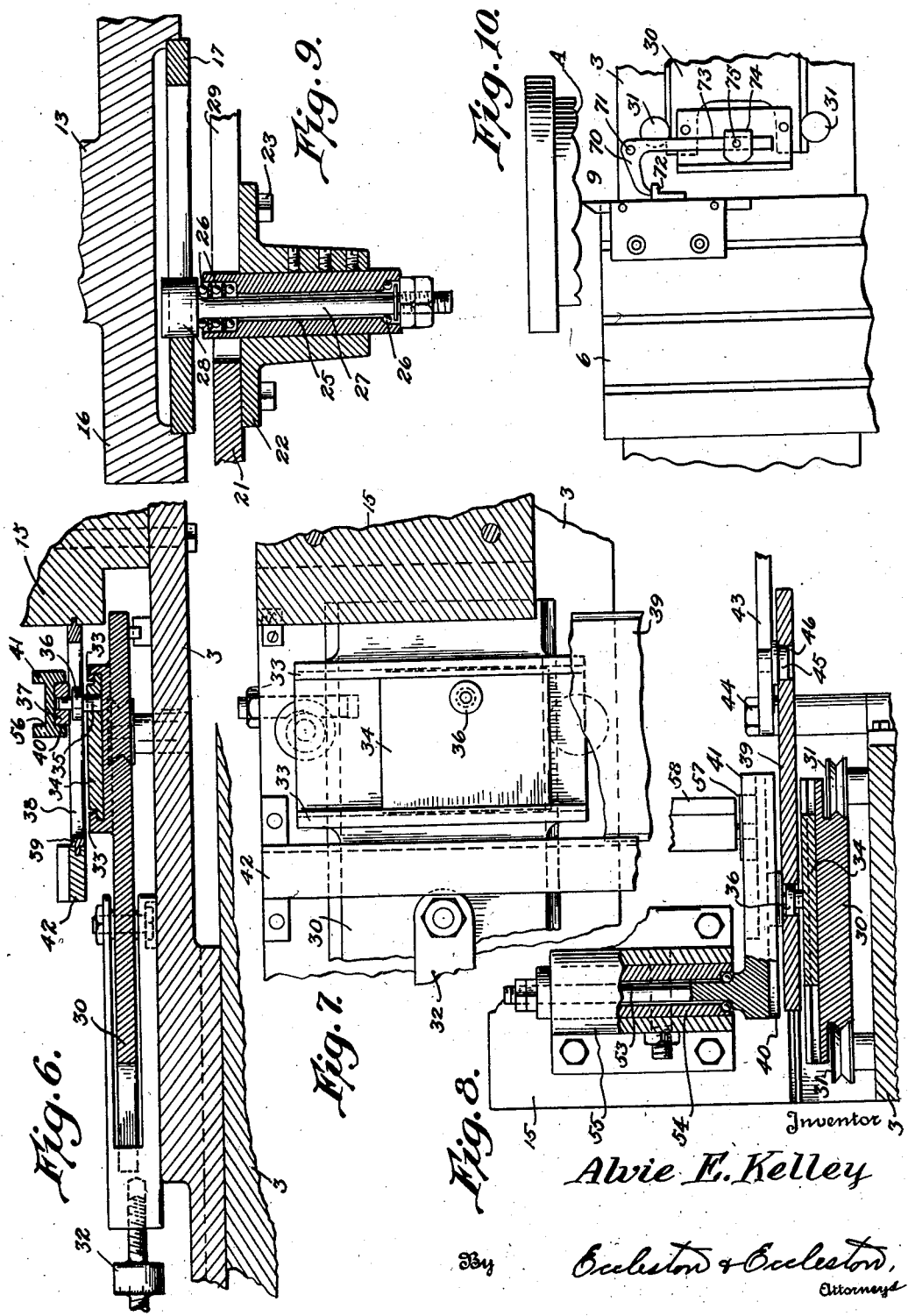

March 5, 1940.  A. E. KELLEY  2,192,267
LATHE FOR TURNING SPECIAL SHAPES
Filed March 1, 1935  4 Sheets-Sheet 4
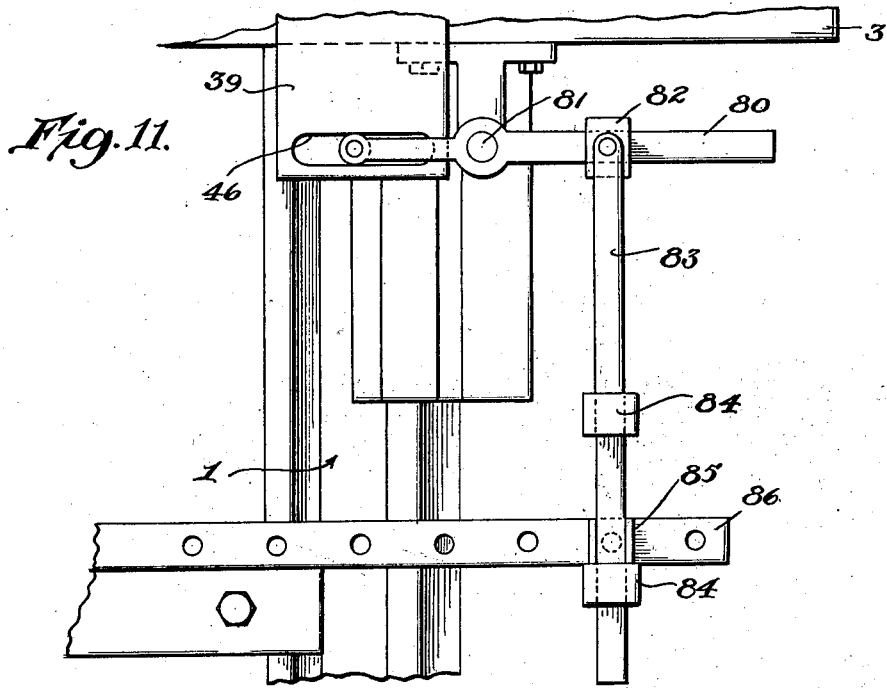
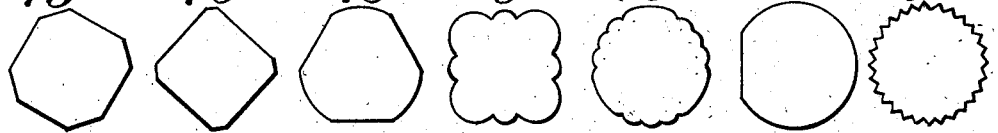
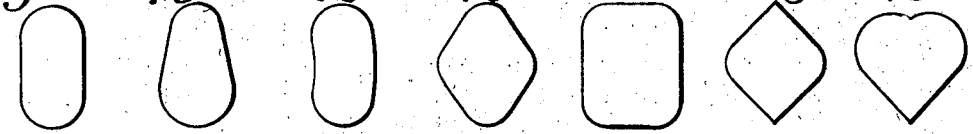
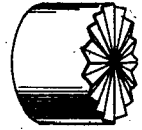 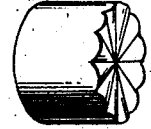 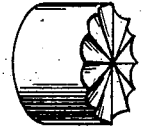 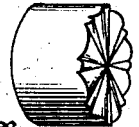
Inventor
Alvie E. Kelley
By Eccleston & Eccleston,
Attorneys Patented Mar. 5, 1940

2,192,267

UNITED STATES PATENT OFFICE 2,192,267

LATHE FOR TURNING SPECIAL SHAPES

Alvie E. Kelley, Washington, Pa.

Application March 1, 1935, Serial No. 8,937

36 Claims. (Cl. 82—19)

This invention relates to an apparatus for turning special shapes in metal stock as in a lathe, and specifically consists in an attachment for a lathe whereby the lathe tool is operated by a record or pattern so as to reproduce various desired shapes.

Another object of the invention consists in a lathe attachment in which particular shapes may be automatically reproduced and in which by a simple adjustment the same shape may be reproduced on a larger or a smaller scale.

Another object of the invention resides in the provision of a lathe attachment for turning special shapes, in which the shape may be modified or magnified by a simple adjustment.

Another object of the invention consists in a lathe attachment including a master record for controlling the reciprocation of the tool, and in which the tracer point may be moved to different points on the record to vary the shape produced in the finished work.

A further object of the invention resides in a lathe attachment which is capable of reproducing various shapes whether they be internal, external or profiles.

A still further object of the invention consists in providing a lathe attachment as above mentioned in which the article to be copied or reproduced may be secured on the chuck of the lathe and used as a guide or pattern in producing the master record for reproducing the particular article.

Other objects and advantages of the invention will be apparent from the following description when taken in connection with the accompanying drawings, in which, Figure 1 is a fragmentary perspective view of a lathe with the attachment mounted thereon.

Figure 2 is a detail showing the extent of tool movement in producing a square object.

Figure 3 is a fragmentary plan view of a lathe with the attachment thereon and partly in section.

Figures 4 and 5 are detail views showing the tool movements in producing modified and magnified square objects.

Figure 6 is a vertical sectional view taken on line 6—6 of Figure 3.

Figure 7 is a fragmentary detail view of the attachment with parts broken away to more clearly show the compensator plate.

Figure 8 is a vertical sectional view taken on line 8—8 of Figure 3.

Figure 9 is a detail sectional view taken on line 9—9 of Figure 1.

Figure 10 is a detail plan view showing an adaptation of the apparatus for cutting profiles.

Figure 10ª is a fragmentary view of a cutter mounted in position on the tracer shaft for cutting a master record to the necessary shape for reproducing a desired design.

Figure 11 is a fragmentary plan view of a modified control for the compensator, and Figures 12 to 36 are views of a few of the many shapes adapted to be turned by the lathe.

Referring to the drawings in greater detail the numeral 1 indicates the bed of the lathe provided with the usual carriage 2. The numeral 3 indicates the cross-slide of the lathe which may be adjusted transversely of the lathe by means of the crank 4.

Bolted on the cross-slide 3 and adapted to be swiveled to any angle therewith is a plate 5. This plate serves as a base for a reciprocating table 6 which is provided with anti-friction bearings 7. A tool holder 8 is adjustably mounted on the table 6 and carries a suitable tool 9. This holder is also adapted to hold a tracer point as will appear later.

The lathe is provided with the usual chuck or face plate 10 adapted to clamp the work to be rotated against the tool 9. The chuck also serves to hold a model against a tracer point as will be described hereinafter.

The shaft on which the chuck 10 is mounted is rotated in the usual manner by means not shown, and geared to this same driving means is a telescoping drive shaft 11 connected by a universal coupling 12 to a spindle 13 which carries the master record to be described. A drum 14 fixed to spindle 13 is graduated in degrees so as to facilitate the proper setting of the master record. The bearing for shaft 11 is variable so that the ratio of the turns of this shaft to the turns of the chuck shaft may be varied as desired. In the present illustration the shaft 11 is geared to make four rotations to one rotation of the chuck shaft.

The spindle 13 is mounted in suitable bearings in a housing 15 fixed to the cross-slide 3, and protruding from the housing is a face plate or enlargement 16 to which a master record 17 is secured by means of bolts 18. In the present instance the record 17 is shown as a ring having the desired internal contour but it is to be understood that the record may be in the form of a disc having the desired external contour, if desired.

The face plate 16 on spindle 13 is indicated as a drum, and a brake 19 is provided for cooperation with the periphery of the drum to prevent lost motion or back lash, however it will be apparent that if a worm drive is provided for the shaft 11 a brake will be unnecessary.

Mounted on the side of the housing 15 are four V-grooved guide rollers 20. These rollers are preferably mounted on eccentric sleeves to provide for adjustment, and ball bearings serve to reduce friction to a minimum.

The rollers 20 provide a guideway for a transmission bar 21 which is mounted for horizontal reciprocation between the upper and lower sets of rollers. A tracer point plate 22 is adjustably secured to the bar 21 by means of bolts 23, and upper and lower series of bolt holes 24 are provided for this purpose. Supported on the plate 22 is a sleeve 25 which supports ball bearings 26 for a spindle 27. On the inner end of the spindle is the tracer point 28, here indicated as a small integral roller, but it will be understood that its construction may be varied as desired. It should be mentioned however that the diameter of the tracer point or roller should be of the same diameter as the tool which is used in initially cutting the shape of the particular record being used. The tracer point spindle 27 extends through an elongated slot 29 in bar 21, the length of the slot being sufficient to permit the tracer point to be adjusted to the opposite side of the record 17 for a purpose which will appear hereinafter.

The connection between the transmission bar 21 and the tool table 6 will now be described.

Mounted on the upper surface of the cross-slide 3 is a transmission plate 30. This plate is reciprocated between pairs of guide rollers 31, and is connected at one end to the tool table 6 by means of a turnbuckle 32 which is graduated for micrometer adjustment. The opposite end of the transmission plate 30 is provided with a pair of transversely extending guide ways 33, between which is slidably mounted a compensator plate 34.

Extending upwardly from the plate 34 is a pin 35 provided with a roller 36 and a block 37 spaced above the roller and swiveled to the upper end of the pin. The roller 36 cooperates with a transverse slot 38 formed in a control plate 39, and the block 37 is slidable in a groove 40 in the underside of a transmission lever 41. The control plate 39 is adapted to be moved transversely of the cross-slide of the lathe and to this end has its edges suitably mounted in guide grooves formed in a guide member 42 and a wall of housing 15.

Control plate 39 is operated by means of a bell-crank lever 43 which is pivotally connected to the cross-slide 3 as indicated by numeral 44. One arm of the bell-crank 43 is provided with a roller 45 located in a slot 46 in the control plate, and the other arm of the lever is provided with an adjustable block 47 carrying a roller or the like on its underside adapted to travel in a groove 48 formed in a plate 49. The plate 49 is adjustable toward or away from the axis of the lathe by a hand-crank 50, and may be adjusted longitudinally of the lathe by loosening bolts 51 which secure it in the slot 52 of the carriage 2.

With the foregoing connections of the bell-crank lever 43, that is, with the pivotal connection on the cross-slide 3 and one arm slidably connected to the carriage it will be apparent that any movement of the cross-slide transversely of the lathe will impart a longitudinal movement to the control plate 39 and likewise to the compensator plate 34.

Reverting to the transmission lever 41, one end thereof is provided with a pintle 53 mounted in ball-bearings located in a sleeve 54. This sleeve is mounted in a casing 55 secured to housing 15. The upper side of lever 41 is provided with a longitudinal slot 56 similar to the slot 40 on the under-side of the lever in which block 37 is mounted. Located in the slot 56 and adapted for sliding movement is a block 57 which is pivoted on the lower end of a post 58. This post 58 is fixed to the inner end of the transmission bar 21 heretofore described, and it will be apparent that any motion imparted to this bar by the record 17 and tracer point 28 will produce oscillations in transmission lever 41 about its pivot 53. Moreover, the oscillation of lever 41 will be converted by its connection with pin 35 and compensator plate 34 into a reciprocating movement of transmission plate 30, tool table 6 and tool 9.

Secured to the outer end of the table 6 is a rod 60 provided with a nut and washer 61 which forms one abutment for a coil spring 62 surrounding the rod. The opposite end of spring 62 engages a plate 63 adjustably mounted on a rod 64 which is fixed to the cross-slide 3. The rod 60 extends freely through an opening in plate 63 and the action of the spring 62 serves to draw the table 6 and tool 9 away from the axis of the lathe insofar as it is permitted to do so by the master record 17. Under certain conditions however it is desirable to shift the tracer point 28 to the right hand side of the record by shifting the plate 22 through the medium of the holes 24 in plate 21. When this change is made, for reasons which will later appear, the spring 62 and plate 63 are re-arranged so as to cause the spring to force the tool toward the axis of the lathe, and the record 17 acts to force the tool away from the axis of the lathe.

Rods 65 and 66 similar to rods 60 and 64 are mounted on transmission bar 21 and the housing 15 respectively, and a relatively weak spring 67 engages a plate 68 adjustably mounted on rod 66 and threaded onto the rod 65. This spring tends to force the bar 21 to the left (Figure 1) and thus assist spring 62 in biasing the tool 9 away from the axis of the lathe.

In Figure 10 is shown a slight modification of the construction wherein the base plate 5 and tool table 6 are rotated through 90° with respect to the cross-slide 3 so that the tool 9 may be positioned to cut profiles as indicated at A. When operating on this type of work the necessary movement is imparted to the tool by means of a bell-crank 70 which is pivoted to the cross-slide 3 as indicated at 71, and has one arm in cooperation with a lug 72 on the side of the tool table 6. The other arm 73 of the bell crank is slidably mounted in a block 74 which is pivotally mounted on the transmission plate 30 as indicated at 75. Reciprocatory movements of the plate 30 transmitted from the record 17 and tracer point 28 are thus imparted to the tool 9 through the bell-crank.

While the plate 5 is shown in Figure 10 as extending lengthwise of the lathe it is to be understood that it may be adjusted to any position intermediate the two extremes shown in Figures 1 and 10.

The operation of the shape lathe in preparing the master record from a pattern to be reproduced, and in reproducing a few of the many shapes of which the machine is capable, will now be described.

Assuming that it is desired to turn a rod of three inch diameter down to a square of three inches between its diagonal corners, the procedure will be as follows:

The master record to be used on the enlargement 16 of spindle 13 may be made by hand or on the machine. If made on the machine, the pattern or model of the shape to be reproduced is first properly centered in the chuck 10. A blunt tool or tracer point is then placed in the tool holder 8 and brought into contact with the surface of the model. The action of spring 62 is reversed so as to bias the tracer point toward the axis of the lathe. The blank from which the master record is to be made, which is a steel ring or disc, is then mounted on the element 16, and an end mill or other cutter 28' on shaft 27' is mounted in the sleeve 25. This cutter may be held stationary with respect to the sleeve or be caused to rotate by means of a small motor. As the lathe shaft rotates the dull tool or tracer point in holder 8 will follow the contour of the model or sample piece and the cutter will produce the shape record required. It will be understood of course that the proper gear ratio must be used in preparing the record. For instance, in the example under consideration the model is of square cross-section, and in making the master record the gear ratio between the spindle 13 and chuck 10 must be four to one. With this manner of producing the master record, the record will be more nearly accurate than the original model inasmuch as each side of the model in turn serves in guiding the cutting tool on the master record, so that any inaccuracy in the model will be greatly modified or entirely eliminated in the master record. It should also be noted that when using the master record the tracer point used must be of the same diameter as the cutter used in forming the master record, in order to obtain accurate reproductions of the model.

With master record 17 prepared and in place on spindle 13, a cutting tool is mounted in holder 8 to replace the blunt instrument used as a tracer in making the record. The spring 62 is returned to its normal position so as to bias the tool away from the axis of the lathe and the stock to be operated upon is centered in the chuck. The cross-slide 3 is now moved by crank 4 to bring tool 9 into contact with the side of the three inch rod. As the lathe is set in operation the master record 17 which is geared four to one will reciprocate the tool in and out four times during each rotation of the chuck 10. This operation will cause cuts to be made on the stock at 90° intervals around its periphery. The cross-slide is then moved inwardly the desired amount to take off another cut, and so on until the square is reproduced as shown in Figure 1.

The shape of the master record for reproducing a square is indicated in Figure 1, and comprises a ring having an internal periphery of gradual increasing radius through 180° on each side of the position at which the tracer point 28 is located. The movements of the tool 9 in reproducing a square shape are indicated in Figure 2, but of course the amplitude of the reciprocation of the tool will vary in accordance with the dimensions of the square to be reproduced.

This variation in the reciprocal movements of the tool for different sizes of articles is provided for by the automatic compensator comprising the plate 34 and the pin 35 which is slidably connected with the lever 41. The position of the pin 35 on the lever 41 may be in alignment with the pivot 53 of the lever at which point there is no reciprocation of the tool or it may be positioned at any point along the length of the lever, and the extent of reciprocation of the tool varies of course with the distance of the pin from the pivot point of the lever. This position of the pin is automatically moved toward the pivot of lever 41 as the cross-slide is moved toward the axis of the lathe and when the tool reaches this axis the pin 35 is in direct alignment with the pivot so that there is no reciprocation of the tool whatever. It will be apparent therefore that squares of different dimensions may be made with the same master record, the size depending only upon the initial position of the tool and the diameter of the stock material. Moreover, it will be obvious that such squares may be tapered from end to end and down to a point if desired.

Another adjustment of the compensator may be made through the adjustment of the bell-crank lever 43 about its pivot 44. This adjustment is made through the medium of plate 49 and crank 50. If the crank is operated to move the plate away from the axis of the lathe the pin 35 is moved toward the outer end of lever 41 and the extent of movement of the tool is increased, while if the crank is operated in the opposite direction the extent of movement of the tool is diminished. This adjustment of the compensator serves to produce what may be termed magnified shapes and modified shapes. For instance, if the stroke of the tool is increased a magnified shape is produced as indicated in Figure 5, whereas, if it is reduced the modified shape of Figure 4 is produced; and it will be understood that these shapes may be made more or less pronounced in accordance with the adjustment of the lever 43.

It should also be noted in connection with the adjustment of lever 43 that it forms an essential part in the production of the master records as well as in the reproduction of desired shapes. For instance, suppose a 3" master record is made from a 3" pattern with the compensator pin 35 set at 3" from the pivot of lever 41. The ratio of the compensator position (3") to the radius of the shape (1½") is 2 to 1; therefore the block 47 must be adjusted on the lever 43 so as to provide a 2 to 1 ratio.

It has been mentioned that the tracer point 28 may be moved to the outer end of slot 29 of the transmission bar 21 so as to operate against the far side of the master record, the spring 62 being reversed so as to bias the tool toward the axis of the lathe. With this manner of reciprocating the tool the master record for reproducing a square shape produces a shape such as shown in Figure 15, which is an approximation of a four-leaf clover. Furthermore, this particular shape may be made larger or smaller by adjustment of the cross-slide and through the medium of the automatic compensator.

An almost infinite variety of shapes may be reproduced by varying the contour of the master record 17, by varying the throw of the tool by adjustment of the lever 43, by changing the ratio between chuck 10 and the auxiliary spindle 13, and by changing the position of the tracer point from one side to the other of the master record. A very few of this large number of shapes are shown in Figures 12 to 36. Certain of these shapes are in the form of profiles and are of course turned by the mechanism shown in Figure 10, wherein the tool carriage is caused to reciprocate longitudinally of the lathe.

In addition to the various external shapes which may be cut by the shape lathe, some of which are depicted in the drawings, the same variety of internal shapes may be bored out by suitable modification of the position of the cutting tool.

In Figure 11 is shown a modified construction for operating the automatic compensator. In this construction a straight arm control 80 is substituted for the bell-crank control 43. This arm is pivoted on a post 81 on the carriage 3, and is provided with a swivel block 82 adjustably mounted thereon. A control bar 83 is pivotally connected to the swivel block and is provided with adjustably mounted stops 84. This bar 83 is slidably mounted in a grooved swivel block 85 supported on a bracket 86, which is clamped to the lathe bed.

By suitably adjusting the stops 84 it will be apparent that with this construction the shape lathe may be caused to bore or turn a particular shape for the length desired and then to automatically and gradually change the shape to round in a set length or vice versa.

From the foregoing description taken in connection with the accompanying drawings it will be apparent to those skilled in the art that I have devised a novel construction of shaping lathe for turning, boring and facing special shapes; that the use of a master record provides a simple, rapid and accurate means for reproducing the shape recorded; that the lathe is so designed as to permit, by a reversal of the mechanism, the mechanical production of a master record by mounting the pattern or model in the chuck and using it as a control for a cutting tool operating on the record blank; that by the use of an automatic adjustable compensator the shape produced by a particular master record may be increased or decreased in size as desired; that these shapes may be altered by a manual adjustment of the compensator and by changing the position of the tracer pont on the master record, and that the reciprocating movements of the tool may be automatically modified during the movement of the carriage so as to not only turn a particular shape but also gradually add a round extension thereto.

In accordance with the patent statutes I have described what I now believe to be the preferred form of the invention, but inasmuch as various minor changes may be made in the details of construction without departing from the spirit of the invention it is intended that all such changes be included within the scope of the appended claims.

What I claim is:

1. A shape lathe including a chuck, an auxiliary spindle, means for driving the chuck and spindle in timed relation, a master record secured to the spindle, a cross-slide, a tool holder reciprocably mounted on the cross-slide, an operative connection between the record and tool holder, said connection including a compensator for varying the extent of reciprocable movement of the tool, and a connection between the lathe bed and compensator.

2. A shape lathe including a chuck, an auxiliary spindle, means for driving the chuck and spindle in timed relation, a master record secured to the spindle, a cross-slide, a tool holder reciprocably mounted on the cross-slide, an operative connection between the record and tool holder, said connection including a compensator for varying the extent of reciprocable movement of the tool, and a lost-motion connection between the lathe bead and compensator.

3. A shape lathe including a chuck, an auxiliary spindle, means for driving the chuck and spindle in timed relation, a master record secured to the spindle, a cross-slide, a tool holder reciprocably mounted on the cross-slide, a transmission bar provided with a slot therein and slidably mounted adjacent the record, a tracer member adjustably mounted in the slot on the bar and adapted to cooperate with the record, and means for connecting the transmission bar and tool holder.

4. A shape lathe including a chuck, an auxiliary spindle, means for driving the chuck and spindle in the timed relation, a master record secured to the spindle, a cross-slide, a tool holder reciprocably mounted on the cross-slide, a transmission bar slidably mounted adjacent the record, a tracer member on the bar and cooperating with the record, a lever pivoted to the cross-slide and connected to the transmission bar, and a connection between said lever and tool holder.

5. A shape lathe including a chuck, an auxiliary spindle, means for driving the chuck and spindle in timed relation, a master record secured to the spindle, a cross-slide, a tool holder reciprocably mounted on the cross-slide, a transmission bar slidably mounted adjacent the record, a tracer member on the bar and cooperating with the record, a lever pivoted to the cross-slide and operatively connected to the transmission bar, a plate slidably connected to said lever, and a connection between said plate and tool holder.

6. A shape lathe including a chuck, an auxiliary spindle, means for driving the chuck and spindle in timed relation, a master record secured to the spindle, a cross-slide, a tool holder reciprocably mounted on the cross-slide, a transmission bar slidably mounted adjacent the record, a tracer member on the bar and cooperating with the record, a lever pivoted to the cross-slide and connected to the transmission bar, a plate slidably connected to the lever, a second plate associated with the first plate and adapted to slide therewith, and a connection between said second plate and tool holder.

7. A shape lathe including a chuck, an auxiliary spindle, means for driving the chuck and spindle in timed relation, a master record secured to the spindle, a cross-slide, a tool holder reciprocably mounted on the cross-slide, a transmission bar slidably mounted adjacent the record, a tracer member on the bar and cooperating with the record, and means including a turn-buckle for connecting the transmission bar and tool holder.

8. A shape lathe including a chuck, an auxiliary spindle, means for driving the chuck and spindle in timed relation, a master record secured to the spindle, a cross-slide, a tool holder reciprocably mounted on the cross-slide, a tracer member cooperating with the record, a connection between the tracer member and tool holder, said connection including a compensator mechanism for either automatically or manually modifying the extent of reciprocation of the tool.

9. In a reproducing shape lathe, a chuck, a spindle geared to the main shaft of the lathe, means on said spindle adapted to support a master record, a support for a tracer member mounted adjacent said spindle, and adapted to support a cutting tool, a tool holder reciprocably mounted adjacent the chuck, and a connection between the tracer member support and the tool holder, whereby the lathe is adapted to either reproduce shapes recorded on the master record or to cut a master record in accordance with a model supported in the chuck.

10. In a reproducing shape lathe, a chuck, a spindle geared to the main shaft of the lathe, means on said spindle adapted to support a master record or a master record blank, a support for a tracer member mounted adjacent said spindle and adapted to support a cutting tool, a tool or tracer holder reciprocably mounted adjacent the chuck, a connection between the tracer member support and the tool holder, whereby the lathe is adapted to either reproduce shapes recorded on the master record or to cut a master record in accordance with a model supported in the chuck, and a compensating device for modifying the reciprocating movement of the tool holder in accordance with its distance from the lathe axis.

11. A shape lathe for reproducing articles in which portions of the design are circumferentially repeated one or more times, including a rotatable chuck, a movably-mounted tool holder, an auxiliary spindle, means for driving the chuck and spindle in timed relation, a record of the design to be repeated driven by the spindle, said record being shaped individually in accordance with the work to be accomplished, a connection between the record and tool holder, means for rotating the spindle at a ratio with the lathe chuck corresponding to the number of repetitions of the design, and compensating means for varying the throw of the tool.

12. A reproducing shape lathe for reproducing articles in which portions of the design are repeated, including a chuck, a movable tool holder, and means for controlling the movements of the tool holder and chuck in timed relation, said means including a record of the repeated design cut by a milling tool, said record being shaped individually in accordance with the work to be accomplished, a tracer member for cooperation with the record, said tracer member having a diameter equal to that of the milling tool by which the record was cut, and a connection between the tracer and tool holder.

13. A reproducing shape lathe for reproducing articles in which portions of the design are repeated circumferentially, including a chuck, a movable tool holder, and means for controlling the movements of the tool holder and chuck in timed relation, said means including a record of the repeated design cut by a milling tool, said record being shaped individually in accordance with the work to be accomplished, a tracer member for cooperation with the record, said tracer member having a diameter equal to that of the milling tool by which the record was cut, and a compensating connection between the record and tool holder.

14. A reproducing shape lathe including a chuck, means for mounting a model on the chuck, said model having a circumferentially repeated design, means for producing a record of only one of the designs by the rotation of the model having the repeated design, a cutting tool controlled by the rotation of the record to produce a shape having the repeated design, and means for driving the record and chuck in timed relation.

15. A reproducing shape lathe including a chuck, means for mounting a model on the chuck, said model having a repeated design, means for producing a record of one of the designs by the rotation of the model having the repeated design, a cutting tool controlled by the rotation of the record to produce a shape having the repeated design, and means for automatically varying the throw of the cutting tool in accordance with the size of the design, and means for driving the record and chuck in timed relation.

16. A reproducing shape lathe for reproducing circumferentially repeated designs including a chuck, a spindle geared with the chuck to rotate at a greater speed than the chuck, means for securing a record or a record blank on the spindle, a support for a tracer member adjacent the spindle and adapted to support a cutting tool, a movable tool or tracer holder adjacent the chuck, and a connection between the tracer support and tool holder.

17. A reproducing shape lathe for reproducing circumferentially repeated designs including a chuck, a spindle adjacent the chuck and geared to rotate at least twice as fast as the chuck, means on the spindle adapted to support a master record or a master record blank, a support for a tracer member mounted adjacent the spindle and adapted to support a cutting tool, a tool holder movably supported adjacent the chuck, and a connection between the tracer member support and tool holder.

18. A reproducing shape lathe including a chuck, a spindle adjacent the chuck and geared to rotate at least twice as fast as the chuck, the spindle adapted to support a master record or a master record blank, a support for a tracer member mounted adjacent the spindle and adapted to support a cutting tool, a tool holder movably supported adjacent the chuck, and a compensating connection between the tracer member support and tool holder.

19. In a method of producing master records for effecting repeated designs on a single piece of work in a shape lathe, the steps which comprise positioning a model on a lathe chuck, rotating the model through one of the designs to be repeated on a single piece of work, and by such partial rotation causing a complete cycle of operation of record designing elements to lay out the contour of the master record, which record is rotated in timed relation with the model.

20. The method of producing master records for effecting repeated designs on a single piece of work in a shape lathe, which comprises positioning a model on the lathe chuck, rotating the model through one of the designs to be repeated on a single piece of work, and by such partial rotation causing a complete cycle of operation of a cutting tool to effect an initial cutting of the master record, which record is rotated in timed relation with the model.

21. The method of producing master records for effecting repeated designs on a single piece of work in a shape lathe, which comprises positioning a model on the lathe chuck, rotating the model through one of the designs to be repeated on a single piece of work, by such partial rotation causing a complete cycle of operation of a cutting tool to effect an initial cutting of the master record, which record is rotated in timed relation with the model, and continuing the rotation of the model until the master record is completed.

22. The method of producing master records effecting repeated designs on a single piece of work in a shape lathe, which comprises the steps of positioning a model on a lathe chuck, and rotating the model through the repeated designs to produce a record of one of the repeated designs, which record is rotated in timed relation with the model.

23. The method of reproducing shapes having repeated designs, which comprises the steps of positioning a model on a lathe chuck, rotating the model through the repeated designs to produce a record of one of the designs, which record is rotated in timed relation with the model and employing the record so produced to control the movements of a lathe tool to produce a shape having the repeated design.

24. A reproducing shape lathe including a rotatably mounted chuck adapted to support a model, a tracer member movably mounted adjacent the chuck for cooperation with the model, an auxiliary spindle adapted to support a record blank, means for driving the chuck and spindle in timed relation, a cutting tool movably mounted adjacent the auxiliary spindle, and a connection between the tracer member and cutting tool, said connection including a compensating mechanism for automatically varying the throw of the cutting tool.

25. A reproducing shape lathe for reproducing circumferentially repeated designs, including a rotatably mounted chuck for supporting a model having the repeated design, a tracer member movably mounted adjacent the chuck for cooperation with the model, an auxiliary spindle geared to rotate in timed relation with the chuck and at least twice as fast as the chuck, and adapted to support a record blank, a cutting tool movably mounted adjacent the auxiliary spindle, and a connection between the tracer member and cutting tool.

26. A reproducing shape lathe for reproducing shapes having a circumferentially repeated design, including a rotatably mounted chuck for supporting a model having the repeated design, a tracer member movably mounted adjacent the chuck for cooperation with the model, an auxiliary spindle adapted to support a record blank and geared to rotate in timed relation with the chuck and at a ratio with the lathe chuck corresponding to the number of repetitions of the design, a cutting tool movably mounted adjacent the auxiliary spindle, and a connection between the tracer member and cutting tool.

27. A reproducing shape lathe for reproducing circumferentially repeated designs, including a rotatable chuck adapted to carry either a pattern or a piece of work, means controlled by the rotation of the pattern for cutting a record by a milling tool, and a tracer member of substantially the same diameter as the milling tool adapted to cooperate with the record, a cutting tool associated with the chuck, and said tracer member controlling the movements of said cutting tool in timed relation with the chuck to cut the circumferentially repeated design on a piece of work carried by the chuck.

28. A reproducing shape lathe including a rotatable chuck, a reciprocably mounted tool holder associated with the chuck, means controlling the reciprocations of the tool holder, said means including a record of the shape cut by a milling tool, said record being shaped individually in accordance with the work to be accomplished, and a tracer member having the same diameter as the milling tool which cut the record for cooperation with the record.

29. A reproducing shape lathe including a rotatable chuck, a reciprocably mounted tool holder associated with the chuck, means controlling the reciprocations of the tool holder, said means including a record of the shape cut by a milling tool, said record being shaped individually in accordance with the work to be accomplished, a tracer member having the same diameter as the milling tool which cut the record for cooperation with the record, and an automatic compensating device for varying the throw of the tool holder in accordance with its distance from the axis of the lathe.

30. The method of copying or reproducing shapes, which comprises positioning a model on the lathe chuck, rotating the model to effect the cutting of a master record of a different contour than that of the model, which record is rotated in timed relation with the model, and employing a tracer roller or the like in conjunction with the master record to reproduce a design of the exact shape of the model.

31. The method of copying or reproducing shapes, which comprises positioning a model on the lathe chuck, rotating the model to guide a milling tool in cutting a master record of a different contour than that of the model, which record is rotated in timed relation with the model, and employing a tracer roller of the same diameter as the milling tool in conjunction with the master record to reproduce a design of the exact shape of the model.

32. The method of producing master records for controlling the cutting of designs on a piece of work in a shape lathe, which comprises positioning a model of the work to be reproduced on the lathe chuck, and by the rotation of the model effecting the cutting of a master record of a different contour than that of the model, which record is rotated in timed relation with the model.

33. A reproducing shape lathe for reproducing circumferentially repeated designs, including a rotatable chuck, a movably mounted cutting tool adjacent the chuck, a detachably-mounted movable record cut by a milling tool, said record being shaped individually in accordance with the work to be accomplished, a tracer member associated with the record and controlling movement of the tool to cut the circumferentially repeated design on a piece of work carried by the chuck, said record being of a different contour than that of the design to be cut, and the effective point of the tracer member being spaced from the record a distance equal to the radius of the milling tool by which the record was cut.

34. A reproducing shape lathe for reproducing circumferentially repeated designs, including a rotatable chuck, a movably mounted cutting tool adjacent the chuck, a detachably-mounted movable record cut by a milling tool, said record being shaped individually in accordance with the work to be accomplished, a tracer member associated with the record and controlling movements of the tool to cut the circumferentially repeated design on a piece of work carried by the chuck, said record being of a different contour than that of the design to be cut, and the tracer member comprising a roller or the like having a radius equal to the radius of the milling tool by which the record was cut.

35. In a method of reproducing shapes in a shape lathe, the steps of employing a shape which is to be subsequently reproduced, and from only a fraction of such shape producing a record which is a substantial enlargement of the fractional shape, and subsequently employing such record to reproduce the original complete shape.

36. In a method of reproducing shapes in a shape lathe, the steps of employing a record which is a substantial enlargement of only a fraction of an article to be reproduced, and from such record controlling a tool to reproduce the complete article.

ALVIE E. KELLEY.